United States Patent
Wiggins (10) Patent No.: US 6,867,369 B2
(45) Date of Patent: Mar. 15, 2005

(54) ELECTRICAL/COMMUNICATIONS BOX PROTECTOR AND DRYWALL GUIDE

(75) Inventor: Richard S. Wiggins, Edmonds, WA (US)

(73) Assignee: Straight Edge, Inc., Edmonds, WA (US)

( * ) Notice: Subject to any disclaimer, the term of this patent is extended or adjusted under 35 U.S.C. 154(b) by 0 days.

(21) Appl. No.: 10/402,580

(22) Filed: Mar. 28, 2003

(65) Prior Publication Data

US 2004/0188125 A1 Sep. 30, 2004

(51) Int. Cl.[7] .................................................. H01H 9/02
(52) U.S. Cl. .............................. 174/58; 174/66; 174/67; 220/241; 33/528
(58) Field of Search .............................. 174/58, 50, 53, 174/66, 67; 220/241, 3.2, 3.3, 3.8, 242, 3–8; 33/528, DIG. 10

(56) References Cited

U.S. PATENT DOCUMENTS

| | | | |
|---|---|---|---|
| 1,956,196 A | | 4/1934 | Korab .......................... 247/15 |
| 3,059,803 A | | 10/1962 | Holsinger ................... 220/3.4 |
| 4,469,238 A | * | 9/1984 | Ranalli ..................... 220/254.3 |
| 4,979,633 A | | 12/1990 | Lakey ........................ 220/3.8 |
| 5,525,755 A | | 6/1996 | Christensen ................. 174/67 |
| 5,526,952 A | | 6/1996 | Green ........................ 220/3.8 |
| 5,562,222 A | | 10/1996 | Jordan et al. ................ 220/3.8 |
| 5,710,392 A | | 1/1998 | Bordwell et al. ............. 174/50 |
| 5,881,908 A | * | 3/1999 | Hays et al. .................. 220/669 |
| 5,902,960 A | | 5/1999 | Smith .......................... 174/66 |
| 6,101,731 A | * | 8/2000 | Mesa .......................... 33/528 |
| 6,265,662 B1 | * | 7/2001 | Riedy et al. .................. 174/67 |
| 6,317,995 B1 | | 11/2001 | Hoffman, Sr. ............... 33/528 |
| 6,403,883 B1 | * | 6/2002 | Morgan et al. ............... 174/58 |
| 6,520,363 B1 | * | 2/2003 | Sullivan ..................... 220/3.8 |
| 6,686,540 B2 | * | 2/2004 | Compagnone, Jr. .......... 174/58 |

* cited by examiner

Primary Examiner—Dhiru R. Patel
(74) Attorney, Agent, or Firm—Kathleen T. Petrich (57) ABSTRACT

A temporary protective cover/guide for a universal electrical/communications box, said protective cover having a perimeter side wall, a recessed planar base, and a flange extending outwardly from the side wall such that it is preferably substantially planar and parallel to the planar base. The perimeter side wall and base and flange are of a size and shape to friction fit the recessed base within the box once electrical conductors are pulled into the box. The flange covers nearly all of the upper edge(s) of the box. The cover/guide can be readily attached or removed and provides protection against electrical shocks. In preferred form, at least the base of the cover/guide is transparent so that an inspector can readily view the electrical conductors without having to remove the cover. The cover/guide also functions to assist in marking where the electrical box is and to protect the components from damage and construction workers from electrical shock during the drywall phase of construction prior to installing the permanent electrical component and permanent cover plate.

20 Claims, 8 Drawing Sheets

ELECTRICAL/COMMUNICATIONS BOX PROTECTOR AND DRYWALL GUIDE

TECHNICAL FIELD

The present invention generally relates to protective covers for openings, and more particularly to temporary protective covers and drywall guides for electrical/communications boxes.

BACKGROUND OF THE INVENTION

Temporary protective covers for electrical/communications boxes are known in the prior art, such as those disclosed in Green, U.S. Pat. No. 5,526,952, granted Jun. 18, 1996 and entitled "Protective Covers for Electrical Outlet Boxes"; Jordan et al., U.S. Pat. No. 5,562,222, granted Oct. 8, 1996 and entitled "Temporary Cover for Electrical Outlet Boxes"; and Bordwell et al., U.S. Pat. 5,710,392, granted Jan. 20, 1998 and entitled "Electrical Outlet Box Assembly Having a Removable Cover." These cited references disclose inventions that are unnecessarily complicated to manufacture and use, which makes the disclosed covers commercially undesirable. Moreover, the cover for the Bordwell et al. invention is designed for a non-uniform electrical box, which is also not commercially desirable.

SUMMARY OF THE INVENTION

The present invention is directed to a temporary protective cover/drywall guide that is inexpensive to manufacture, easy to use, protects people from electrical shock, and keeps messy construction mud and paint away from sensitive electrical conductors. The cover/guide of the present invention is designed to friction fit within a universal electrical/communications box having a perimeter side wall with an upper edge that defines an opening within the box. The cover/guide has a substantially planar base and a perimeter side wall such that the side wall is affixed generally perpendicularly to the base. The cover/guide perimeter side wall includes an upper edge to which an outwardly-extending flange is attached. The flange is substantially planar to the base.

The combination of the base, perimeter side wall, and flange all form the recessed cover if the present invention. The cover is of a size and shape to fit within the opening of the box and friction fit within at least a portion of the box side wall.

In use, at least a portion of the perimeter side wall is friction fit within at least a portion of the box side wall. The flange of the cover/guide makes physical contact with at least a portion of the upper edges of the box side wall. In this way, the cover/guide is recessed within the box with a flange keeping the cover from falling within the opening of the box. In preferred form, the flange is very thin such that the cover is nearly recessed within the box and no protrusions extend outwardly of the thin and planar flange.

In a preferred form, the size of the flange conforms to or nearly to the outer edges of the box. At least the base of the cover/guide may be made from a transparent material in order to readily inspect the otherwise live electrical conductors.

There are several embodiments of the cover/guide of the present invention. According to one embodiment, the perimeter side wall is shaped like a rectangle with two pairs of substantially opposed side walls (of same conformance to the side walls in the box). One pair of opposed side walls may include slightly outwardly-bowed side walls. In another embodiment, a detent may be added to a portion of the side wall. In yet another embodiment, the cover/guide may include bump-outs that are formed of a portion of the side wall and the flange to conform and protect to conventional dog ears that are often part of a universal electrical box.

The present invention also functions as a guide during the drywall phase as part of a construction projection. The invention also includes a method of installing drywall over an electrical box. The method includes installing an electrical box slightly ahead of the leading edge of an adjacent stud. After electrical conductors have been pulled to the electrical box, recessed protective cover is provided. The cover has a perimeter side wall and a recessed planar base and a substantially planar flange extending outwardly of the perimeter side wall where the flange is substantially planar to the base. Next, a sheet of drywall is affixed over the stud and electrical box. The approximate location of the box is marked and a hole is made by a drilling device at the marked location between the recessed base and the drywall sheet. The drilling device is then moved from the hole outwardly to the perimeter side wall to drill out the drywall above the recessed cover. Then, the drilling device goes along the outer edges of the flange and box so that the drywall sheet moves over the box and outer edge of the drywall sheet is substantially flush with the flange on the cover/guide. Once the drywall sheet is substantially flush with the flange, the flange can be removed at a later time and the electrical component can be installed with its permanent protective cover over the electrical component all while being in the right position relative to the finished wall.

BRIEF DESCRIPTION OF THE DRAWINGS

Like reference numerals are used to designate like parts throughout the several views of the drawings, wherein.

BEST MODE FOR CARRYING OUT THE INVENTION

Figure 1:
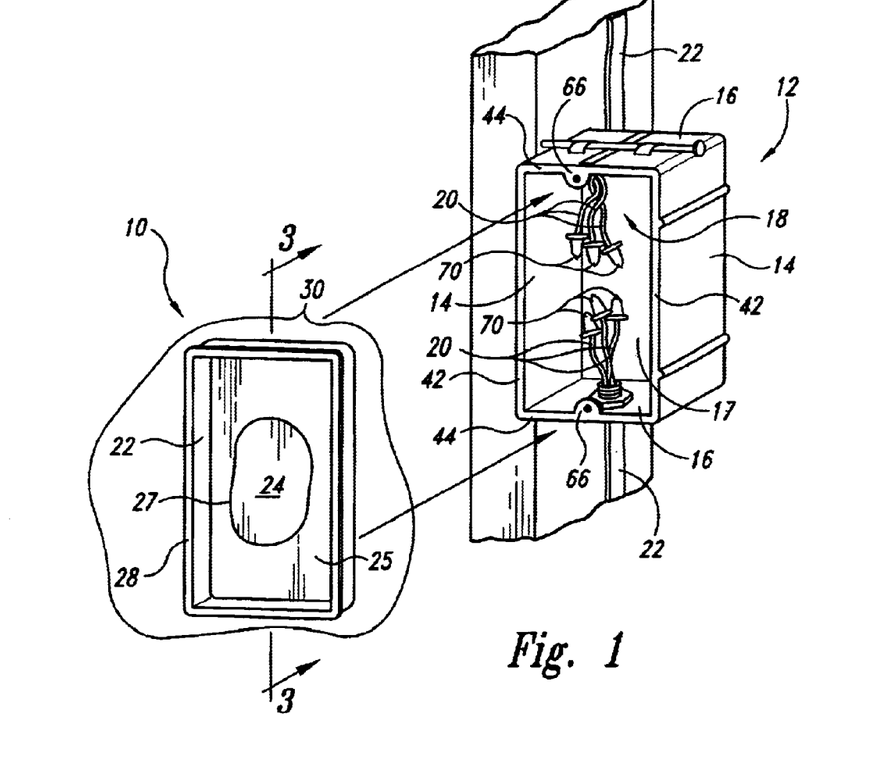
FIG. 1 is a front perspective view of a protective cover/drywall guide of the present invention prior to being friction-fit within an opening defined by side walls of an electrical box.

Referring to FIG. 1, the present invention is directed to a temporary protective cover and drywall guide 10 for an electrical/communications box 12, where a universal box 12 (rectangular box illustrated) includes two pairs of opposed side walls 14, 16, joined by a base 17, and of which all define an opening 18 into the box 12. Alternatively, box 12 may be round or other shapes common to the industry. The combined cover/guide 10 is of a size to be frictionally fit within a mouth of opening 18 of electrical box 12. Electrical box may be a single-gang electrical box, such as illustrated in FIG. 1, or a multiple-gang box, such as a double-gang, four-gang, six gang, etc. (not illustrated). Electrical box 12 is designed to hold electrical conductors such as 20 from ROMEX brand insulated cable 22 (as illustrated) or conduit and wire (not illustrated). The box is typically used to hold and electrically connect a wiring device, such as a duplex receptacle or a toggle switch, or communications connectors, such as a phone jack, (none illustrated) to the electrical conductors 20.

Figure 2:
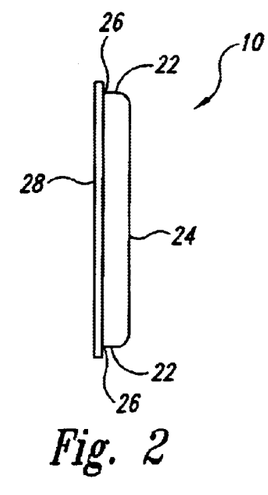
FIG. 2 is a right side view of the cover/guide of FIG. 1.
Figure 3:
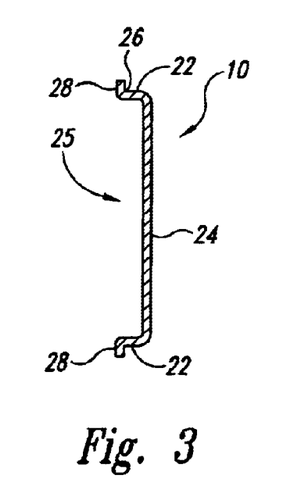
FIG. 3 is a section view of the cover/guide taken substantially along lines 3—3 of FIG. 1.
Figure 4:
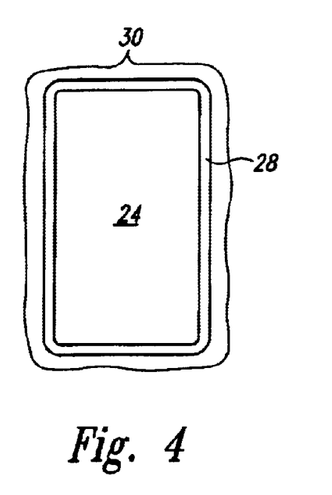
FIG. 4 is a rear view of the cover/guide of FIG. 1.

Referring also to FIGS. 2–4, cover/guide 10 is defined by a perimeter side wall 22 and a substantially planar base 24 such that the side wall 22 and base 24 preferably form a substantially rectangular shape having a recessed base with an inherent opening 25. Side wall 22 includes an upper edge 26 to which a thin flange 28 extends. The perimeter 30 of the flange also has a preferably substantially rectangular shape and is slightly larger in area than the perimeter of the side wall 22, which may be best seen in FIG. 4.

As suggested by FIG. 1, the cover/guide of the present invention includes a recessed base member 24. The recessed base and perimeter side wall are of a size and shape to be able to friction fit within the box. At least a portion of the side wall or an appendage of the side wall 22 is designed to be friction-fit within opening 18 of box 12 against box side walls 14 and/or 16.

The flange 28 is designed to be of a size to fit over or nearly over at least a portion of the box side walls 14, 16. In preferred form, the flange terminates at or nearly at the outer edge of the box side walls, which will be discussed further below.

Figure 5:
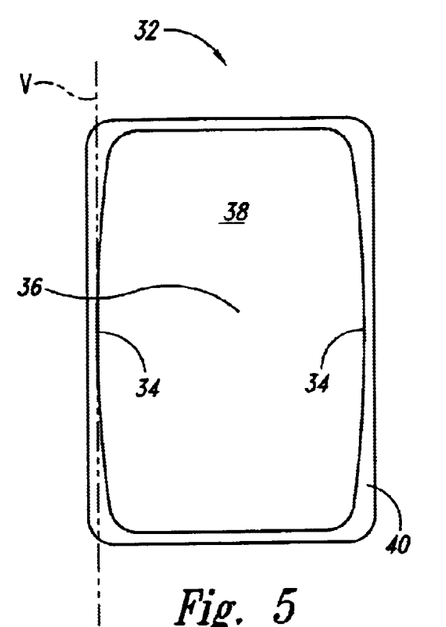
FIG. 5 is a front view of a first alternate embodiment of the cover/guide of the present invention and illustrating a slight slope in the opposing sidewalls.
Figure 6:
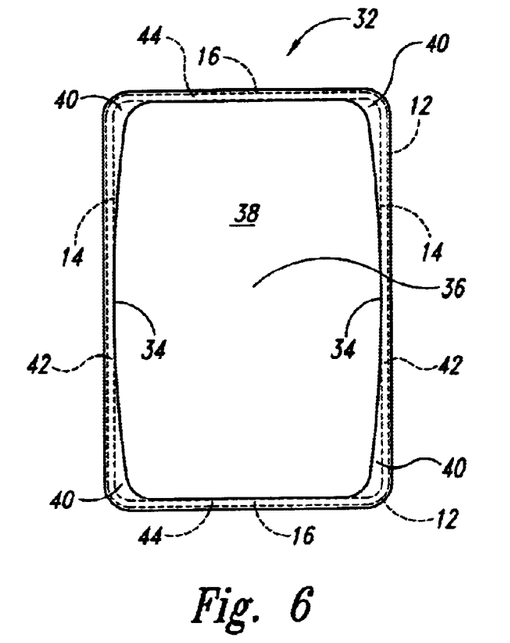
FIG. 6 is a view like FIG. 5 except illustrating the cover/guide friction fit within an electrical box with the upper edges of the box shown in broken lines.
Figure 7:
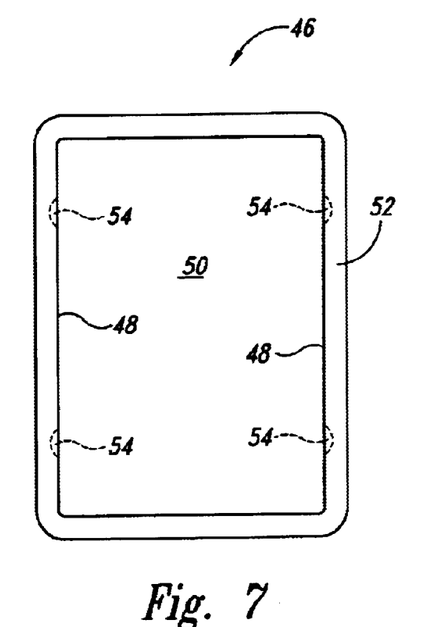
FIG. 7 is a front view of a second alternate embodiment of the cover/guide of the present invention and illustrating a pair of detents shown in broken lines extending outwardly of each opposed side wall of the cover/guide.
Figure 8:
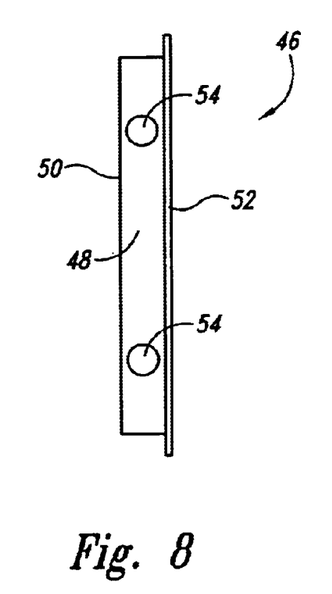
FIG. 8 is a left side view of FIG. 7.
Figure 9:
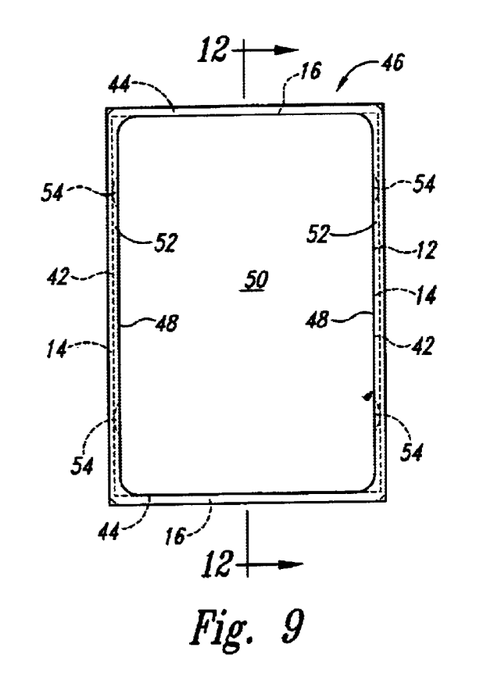
FIG. 9 is a view like FIG. 7 except illustrating the cover/guide friction fit within an electrical box with the upper edges of the box shown in broken lines.
Figure 10:
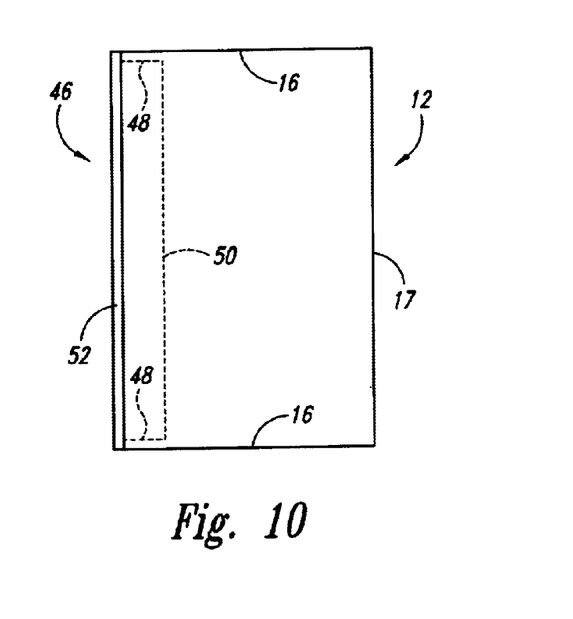
FIG. 10 is a right side view of FIG. 9.

Various forms of the cover/guide are encompassed in the present invention. Referring to FIGS. 5–14, three alternate embodiments are illustrated. FIGS. 5 and 6 illustrate a cover/guide 32, similar to cover/guide 10 of FIGS. 1–4, except longitudinally-opposed side walls 34 have a slightly outwardly bowed shape relative to an imaginary center 36 and an imaginary vertical line V on recessed base 38. The slight outwardly bowed side walls 34 frictionally fit a portion of sidewalls 14 of electrical box 12 in order to securely position cover/guide 32 within the confines of side walls 14 (and possibly side walls 16) of box 12. This can best be seen in the illustration of FIG. 6, where the electrical box 12 is shown in hidden lines. Flange 40, which is similar to flange 28 of FIGS. 1–4, and acts as an abutment against upper edges 42, 44 of side walls 14, 16 of box 12. In this way, the flange allows the recessed base to be positioned within the opening 18 of the box 12 substantially the full depth of side wall 34.

Figure 11:
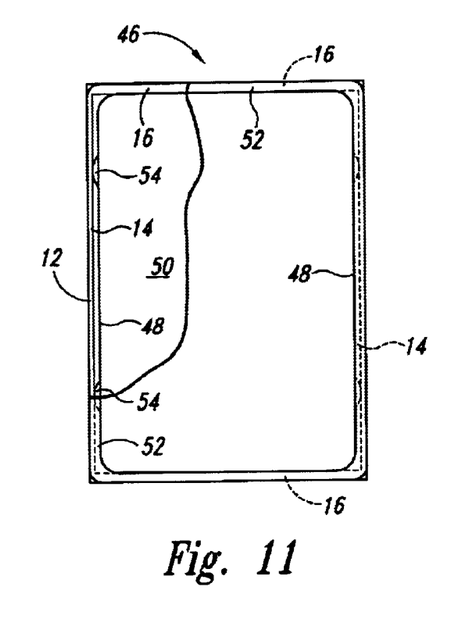
FIG. 11 is a view like FIG. 7 except illustrating in cutaway the friction fit between the cover/guide and a side wall of the electrical box.
Figure 12:
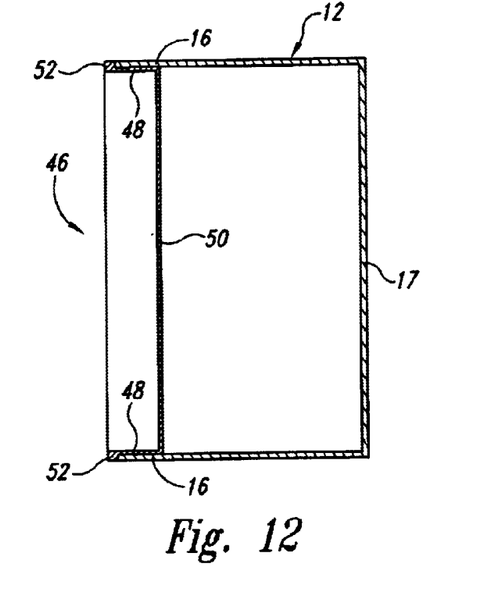
FIG. 12 is a section view taken substantially along lines 12—12 of FIG. 9.

FIGS. 7–12 illustrate another alternate embodiment of a cover/guide 46 having recessed side walls 48, base member 50, and flange 52, all of which may be like those elements 22, 24, 28 illustrated in FIGS. 1–4. In this embodiment, detents 54, such as those illustrated or other traditional detents, may be added to at least an external portion of side wall 48 in order to friction fit with side walls 14 (and possibly side walls 16, though not illustrated) of box 12, such as illustrated in FIGS. 11 and 12.

Figures 13, 14, 15:
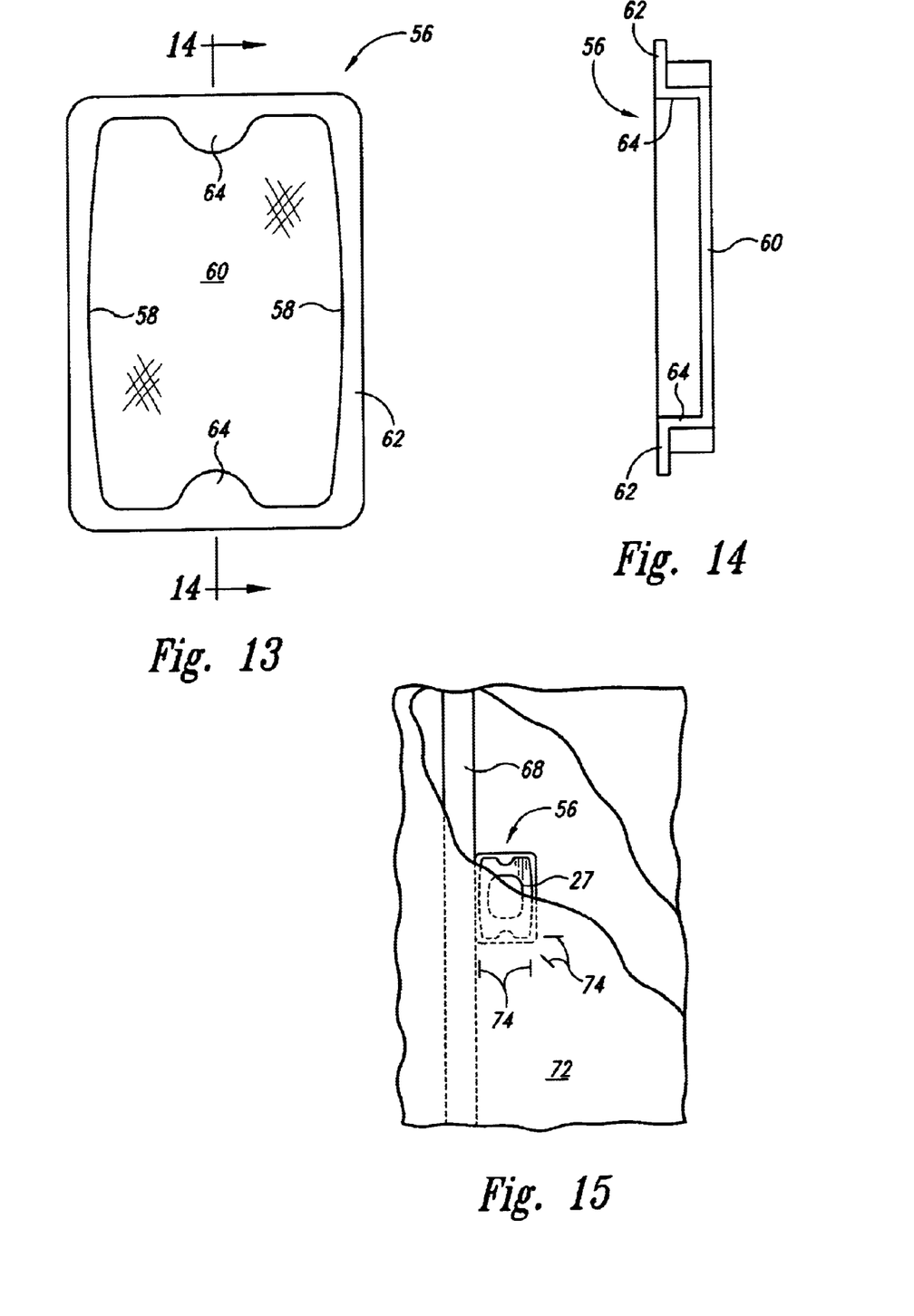
FIG. 13 is a front view of a third alternate embodiment of the cover/guide of the present invention.
FIG. 14 is a section view taken substantially along lines 14—14 of FIG. 13 and looking to the left.
FIG. 15 is a front view of a sheet of drywall over a stud and electrical box including the cover/guide, with a portion of the stud and cover/guide and electrical box shown in cutaway.

FIGS. 13 and 14 illustrate yet another embodiment of the cover/guide of the present invention. In this embodiment, cover/guide 56 may include side walls 58 like those illustrated in either FIG. 5 or FIG. 7 (the slightly outwardly bowed side walls of FIG. 5 are illustrated). Similar to the other embodiments described above, cover/guide 56 further includes recessed base member 60 and flange 62. In this embodiment, cover/guide 56 also includes bump outs 64 formed of the flange and the side wall to protect conventional dog ears 66 (illustrated in FIG. 1) of box 12. Dog ears 66 are flanges with a mounting hole in order to structurally support a wire device or switch or other electrical component (not illustrated) when ultimately installed in the electrical box 12. Bump outs 64 of cover/guide 56 are designed to give protection to dog ears 66 during the drywall process as well as routing out the hole of the drywall to access the electrical conductors inside box 12.

The cover/guide of the present invention may be made from a variety of materials. In preferred form, the cover/guide is molded or stamped from a thin (e.g. a few millimeters thick) synthetic material, such as a thermo-resin, or other plastic or polymer. In this way, the invention is fairly simple and very cost-effective to manufacture. Given the overall shape of the cover/guide of the various embodiments and because the cover/guide is designed to be thin and lightweight, many cover/guides can be stacked together, thereby decreasing warehouse space for large quantities of commercialized production of the invention and, thereby, decreasing distribution costs.

According to one aspect of the present invention, the cover/guide may be made from a transparent material such that the electrical conductors can be easily seen through at least a substantial portion of the planar 27 base member. This feature provides others a visual indication of whether there are "live" electrical conductors adjacent the construction site. This feature is particularly useful to electrical inspectors who need to visually inspect the electrical installation but still remain protected from electrical shock from otherwise "hot" wires. The transparent cover also is useful to construction workers who are working on a particular phase of construction prior to a permanent cover being placed over the "hot" wires.

Referring now to FIGS. 15–22, the cover/guide of the present invention not only protects sensitive and potentially dangerous electrical conductors during the construction phase (particularly drywalling), but also functions as a guide to mark the box outline during the drywall phase.

The cover/guide is particularly useful during construction of a particular project. During construction, certain construction procedures remain intact, regardless whether the construction is a remodel or new construction and whether the project is a residential building or a commercial building. First, the framers/structural construction crews begin the structural support beams and posts after the construction site has been prepared (demolition, slab pours, foundation work). Once the framers have finished, the electrical crew comes in and, amongst other tasks, lays out all of the electrical/communications boxes per some form of electrical plan.

Referring to FIG. 1 and FIG. 15, each box is nailed or otherwise affixed to an adjacent stud 68. In preferred form, the box extends past the end of the stud 68 by a small distance, e.g. by approximately ½ inch. An electrician pulls all the electrical conductors 20 to the individual electrical boxes and caps off the loose wires of the electrical connectors with twist-on connectors 70. Once this is done, the electrician positions the cover/guide of the present invention within the opening of the box such that at least a portion of the side wall of the cover/guide is friction fit with at least a portion of the box side walls, such as illustrated in FIGS. 11 and 12. The flange substantially covers the upper edges of the box side walls; but preferably does not extend past the outer edges of the box. In this way, the cover/guide is secured to the electrical box and acts as a protective barrier to the "hot" electrical conductors. Moreover, the optional transparent material allows inspectors/fellow workers to immediately ascertain the status of a particular electrical box (that is, whether wires are pulled to the box and capped off) without the threat of electrical shock.

At this point, the electricians may leave the job site until it is time to return to remove the cover/guide, install the specific electrical device (e.g. duplex receptacle, toggle switch, etc.), and, thereafter, install the permanent, conventional cover plate. In the meantime, drywallers would typically enter the construction site in order to install drywall sheets over the studs and electrical boxes that will become walls and ceilings of the particular room or interior. A drywaller will install large sheets of drywall over an area having several studs and, typically, electrical boxes. It is time consuming to mark each electrical box location and cut the box opening with a knife and then affix the drywall sheet over a stud and slightly "bumped-out" box.

Figure 16:
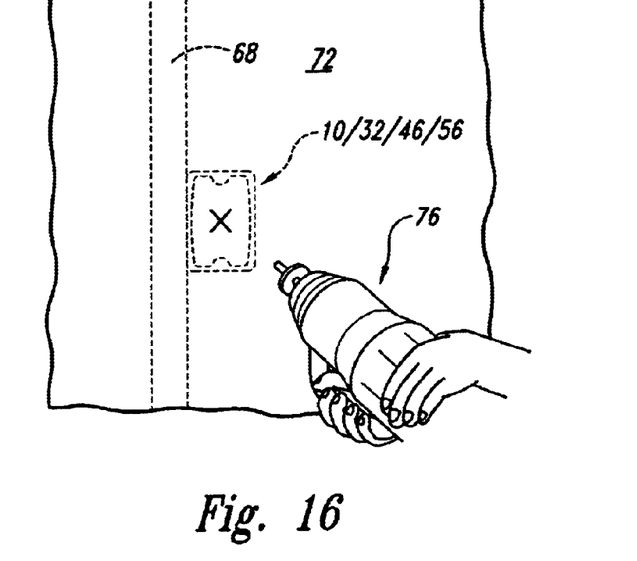
FIG. 16 is a perspective view of a rotor or drywall drill about to make a hole in the drywall sheet where the cover/guide and electrical box are.
Figure 17:
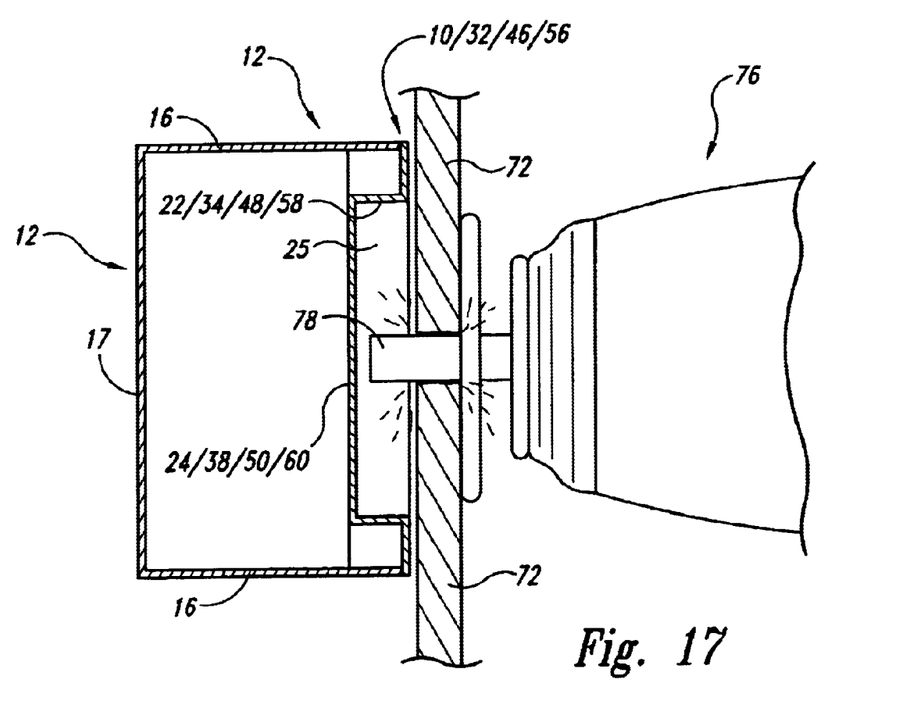
FIG. 17 is a side view of a rotor bit breaking through the drywall sheet and within the recessed portion of the cover/guide.
Figure 18:
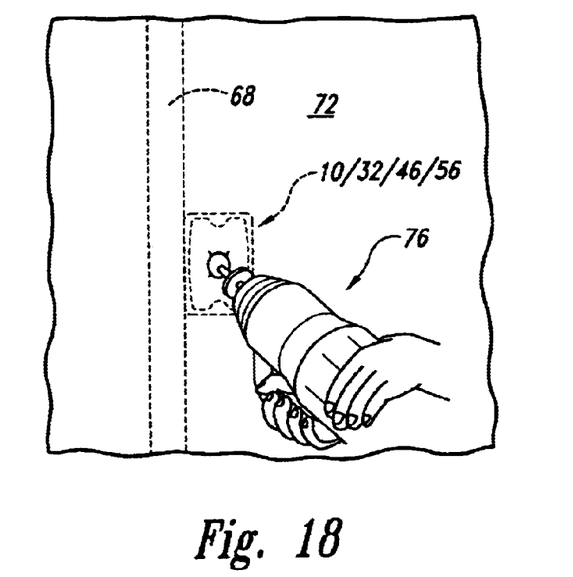
FIG. 18 is a view like FIG. 16 with the rotor moving upward toward the upper edge of the recessed sidewall of the cover/guide to determine the outline of the hole to access the electrical box through the drywall sheet.
Figure 19:
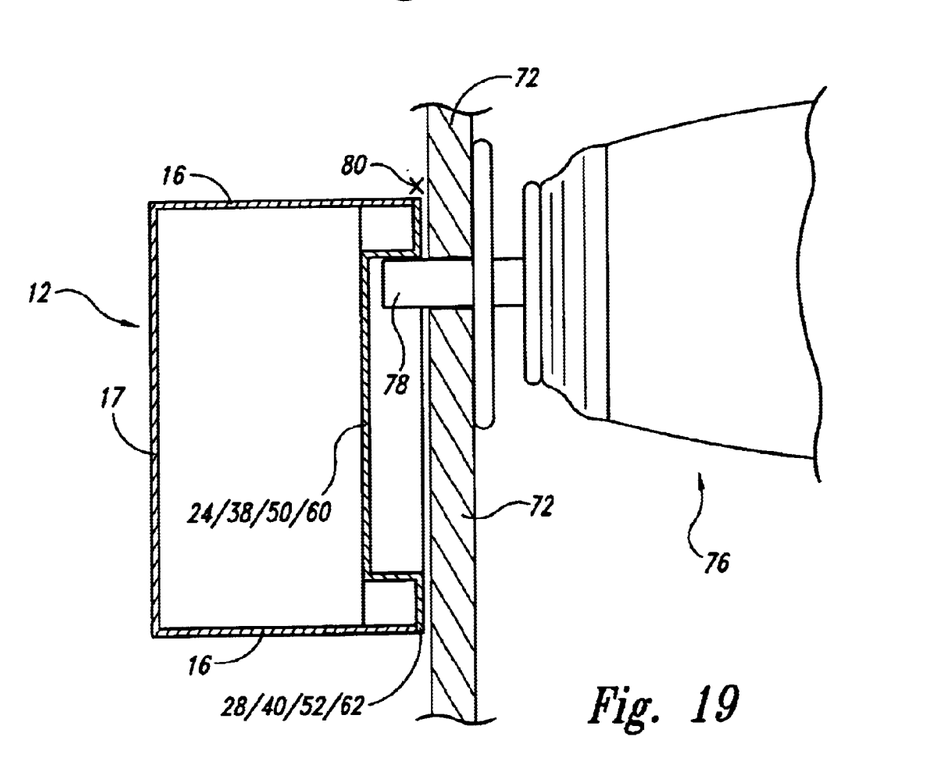
FIG. 19 is a view like FIG. 17 with the rotor drilling a hole in the drywall sheet conforming to the upper edge of the recessed side wall of the cover/guide.
Figure 20:
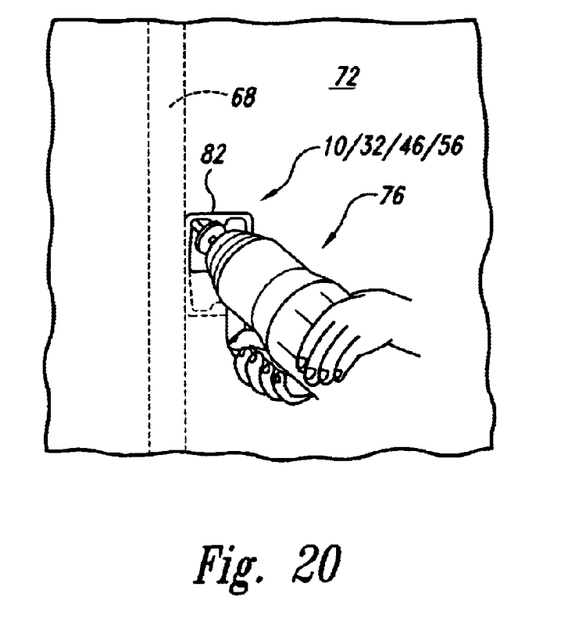
FIG. 20 is a view like FIGS. 16 and 18 better illustrating more of the opening in the drywall sheet conforming to the recessed sidewall of the cover/guide.
Figure 21:
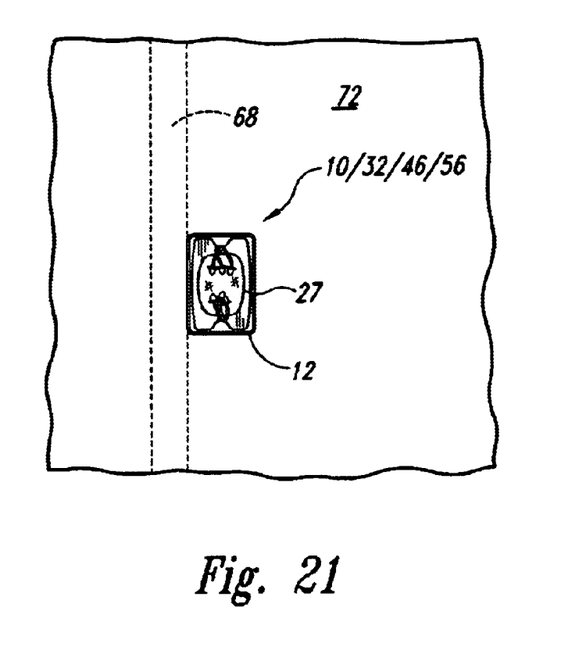
FIG. 21 is a front view of the electrical box and connectors as seen through a transparent cover/guide of the present invention through the hold formed in the drywall sheet.
Figure 22:
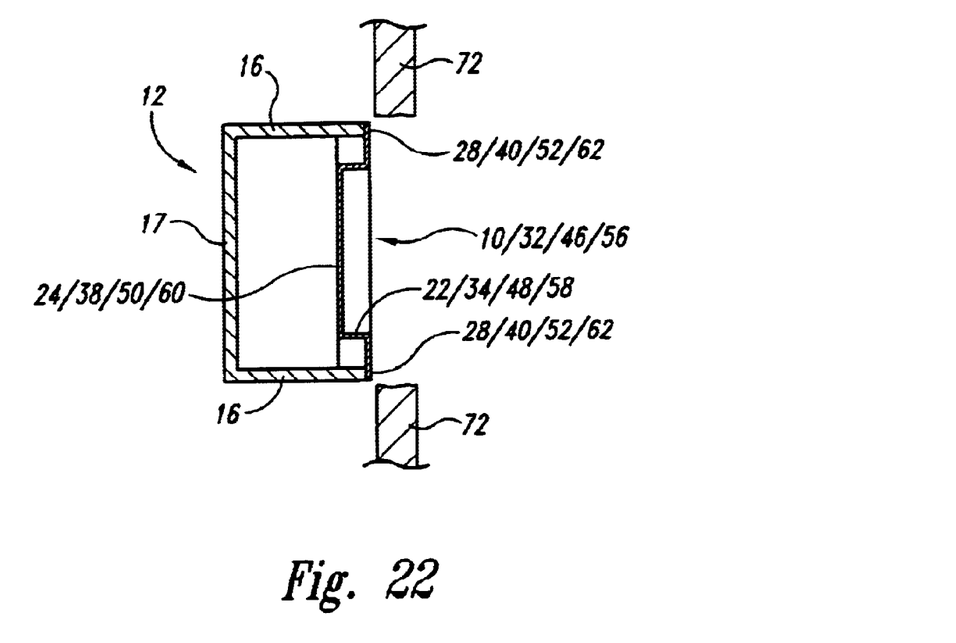
FIG. 22 is a section view of electrical box and cover/guide and drywall taken substantially across lines 22—22 of FIG. 21 shown immediately prior to the drywall sheet moving back to its predestined state (and shown less the electrical conductors)
Figure 23:
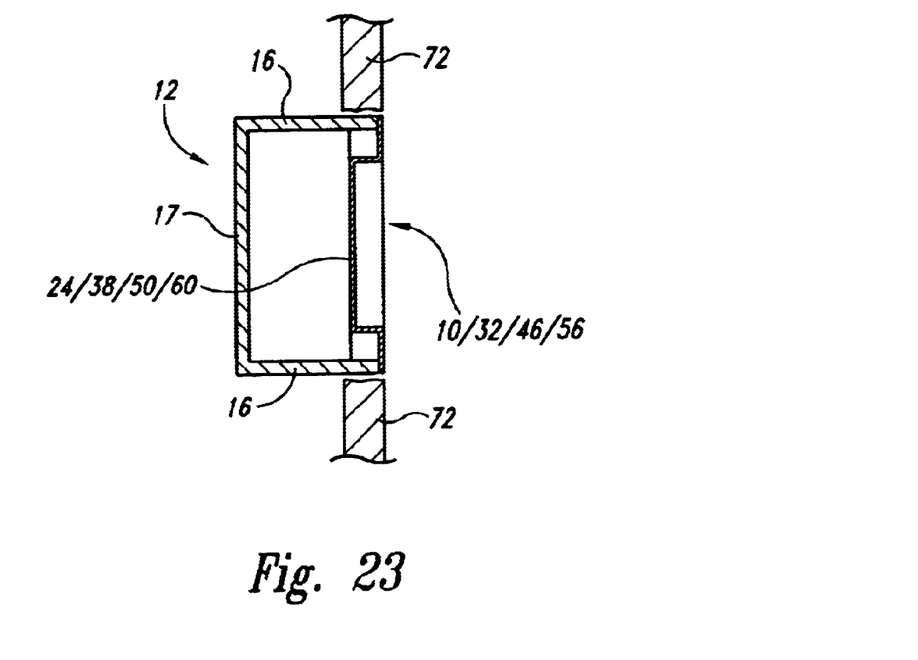
FIG. 23 is a section view like FIG. 22 except illustrating that the drywall sheet has moved back into place into its predestined state once the hole formed in the drywall fits over the cover/guide.

To save time, drywallers typically will place the drywall sheet 72 over the studs and affix (e.g. screw) the drywall to the studs at the perimeters of the drywall sheet. The electrical boxes, sticking out approximately ½ inch from the studs, puts a slight pressure on the drywall sheet as illustrated by stress marks 74 in FIG. 15. The drywaller marks the center of the box with an X or other visual marking (FIG. 16). The drywaller then takes a drilling device 76 such as a router, and makes a hole at the location of the X. As the router bit 78 extends only a small distance (e.g. ⅛ inch), the router does not make contact with the base member as best illustrated in FIG. 17. The rotor is moved in an outward direction toward the side wall, removing drywall as the router bit is moved. The router bit contours the shape of the recessed cover to remove the drywall there between. Once the drywall is removed within the recessed portion of the cover/guide, the router is repositioned at the perimeter 82 of the flange covered box marked "80" in FIG. 19 to route out the drywall of the entire area defined by the cover/guide (FIG. 20). Once the drywall in front of the electrical box is finally routed out (FIG. 22), the drywall falls back to its desired location around the box such that the leading edge of the drywall is substantially flush with the flange and upper edges of the box side walls (FIG. 23). The cover/guide remains intact over the electrical conductors during the mudding, taping, and painting phases to act as a protective barrier to and for live electrical parts during these traditionally messy phases.

Once the finishing work is done, the electrician returns to install the wiring device. The cover/guide is easily removed for future reuse (if not covered with mud or paint) or disposal. The electrician has ready access to the live electrical conductors in order to install the wiring device and put on the permanent cover.

The illustrated embodiments are only examples of the present invention and, therefore, are non-limitive. It is to be understood that many changes in the particular structure, materials, and features of the invention may be made without departing from the spirit and scope of the invention. Therefore, it is the Applicant's intention that his patent rights not be limited by the particular embodiments illustrated and described herein, but rather by the following claims interpreted according to accepted doctrines of claim interpretation, including the Doctrine of Equivalents and Reversal of Parts.

What is claimed is:

1. A protective cover/drywall guide for an opening of a universal electrical/communications box, wherein said box includes a perimeter side wall having a substantially planar upper edge wherein the side wall is joined together by a base all defining the opening, said cover/guide comprising:

a substantially planar base and a perimeter side wall affixed to and extending substantially perpendicularly of the planar base to form an opening between the perimeter side wall and the base;

said perimeter side wall of the cover/guide having an upper edge from which an outwardly extending flange is affixed;

said perimeter side wall of the cover/guide being of a size and shape to be friction fit within at least a portion of the perimeter side wall of the box; wherein in use, the planar base is recessed within the opening of the box and the flange over the cover/guide fits over at least a portion of the upper edge of the box side wall;

wherein said cover/guide is capable of being readily attached to and removed from box opening and upper edge of said box;

said planar base containing a transparent unobstructed viewing area that at least covers a substantial central portion of the planar base.

2. The cover/guide according to claim 1 wherein the perimeter side wall of the cover/guide is substantially a uniform height.

3. The cover/guide according to claim 1 wherein the flange is planar.

4. The cover/guide according to claim 3 wherein the flange is planar.

5. The cover/guide according to claim 4 wherein the planar flange is substantially parallel to the planar base.

6. The cover/guide according to claim 5 wherein the overall shape of the flange is substantially rectangular.

7. The cover/guide according to claim 6 wherein the entire planar base is made from a transparent material.

8. The cover/guide according to claim 3 wherein the planar flange is substantially parallel to the planar base.

9. The cover/guide according to claim 1 wherein the overall shape of the perimeter side wall of the cover/guide is substantially rectangular.

10. The cover/guide according to claim 9 wherein a pair of opposed side walls of the substantially rectangular shape are slightly outwardly bowed relative to an imaginary center of the base portion.

11. The cover/guide according to claim 9 wherein a portion of the perimeter side wall of the cover/guide includes at least one detent.

12. The cover/guide according to claim 9 wherein a pair of opposed side walls each include a bump out.

13. The cover/guide according to claim 9 wherein a pair of opposed side walls of the substantially rectangular shape are slightly outwardly bowed relative to an imaginary center to the base portion.

14. The cover/guide according to claim 1 wherein the entire planar base is made from a transparent material.

15. The cover/guide according to claim 1 wherein a portion of the perimeter side wall of the cover/guide includes at least one detent.

16. A method of installing a sheet of drywall over an electrical box, the method comprising:

applying a universal electrical/communications box to an adjacent stud;

pulling electrical conductors to the box;

providing a protective cover/guide of a size and shape to friction fit within the box over the electrical conductors and such that the cover/guide includes a perimeter side wall and a recessed base, said recessed base including a transparent and unobstructed viewing area at least generally centrally located of the recessed base and a perimeter flange extending upwardly and outwardly of the perimeter side wall, and that the cover/guide is recessed within the box;

applying a drywall sheet over the stud and the covered box;

marking a spot where the box is thought to be under the drywall sheet;

marking a hole with a drilling device where the marked spot is through the drywall sheet and within the recessed area between the box and the cover; and moving the drilling device toward the edges of the cover/guide to remove drywall between the box and the cover such that the electrical conductors can be seen through the unobstructed viewing area of the recessed base of the cover/guide.

17. The method according to claim 16 wherein the box is mounted slightly in front of a leading edge of the stud so that when the drywall sheet is applied over the stud and the covered box, there is a slight pressure on the drywall sheet over the covered box and the drywall sheet sticks out a small amount past the stud.

18. The method according to claim 17, wherein the drywall is further removed from the covered box at the outer edges of the covered box and that all of the drywall is removed where the covered box including its outer edges is positioned;

and wherein the drywall sheet falls to its unpressurized state back about the box.

19. A method of installing a sheet of drywall over an electrical box, the method comprising:

applying a universal electrical/communications box to an adjacent stud;

pulling electrical conductors to the box;

providing a protective cover/guide of a size and shape to friction fit within the box over the electrical conductors and such that the cover/guide includes a perimeter side wall and a recessed base, and a perimeter flange extending upwardly and outwardly of the perimeter side wall, and that the cover/guide is recessed within the box;

applying a drywall sheet over the stud and the covered box;

marking a spot where the box is thought to be under the drywall sheet;

marking a hole with a drilling device where the marked spot is through the drywall sheet and within the recessed area between the box and the cover; and moving the drilling device toward the edges of the cover/guide to remove drywall between the box and the cover wherein the box is mounted slightly in front of a leading edge of the stud so that when the drywall sheet is applied over the stud and the covered box, there is a slight pressure on the drywall sheet over the covered box and the drywall sheet sticks out a small amount past the stud.

20. The method according to claim 19, wherein the drywall is further removed from the covered box at the outer edges of the covered box and that all of the drywall is removed where the covered box including its outer edges is positioned;

and wherein the drywall sheet falls to its unpressurized state back about the box.

\* \* \* \* \*

UNITED STATES PATENT AND TRADEMARK OFFICE
CERTIFICATE OF CORRECTION

PATENT NO. : 6,867,369 B2
DATED : March 15, 2005
INVENTOR(S) : Wiggins, Richard S.

It is certified that error appears in the above-identified patent and that said Letters Patent is hereby corrected as shown below:

Column 5,
Line 47, please substitute ";" with -- , --.

Column 6,
Line 8, please insert -- , -- after "76".

Signed and Sealed this

Twenty-third Day of August, 2005

JON W. DUDAS
*Director of the United States Patent and Trademark Office*